US005729473A

United States Patent [19]

Blanc et al.

[11] Patent Number: 5,729,473

[45] Date of Patent: Mar. 17, 1998

[54] METHOD AND DEVICE FOR GENERATING COLORIMETRIC DATA FOR USE IN THE AUTOMATIC SORTING OF PRODUCTS, NOTABLY FRUITS OR VEGETABLES

[75] Inventors: Philippe Blanc; Gilles Romero, both of Montauban, France

[73] Assignee: Materiel Pour L'Arboriculture Fruitiere, Montauban, France

[21] Appl. No.: 222,302

[22] Filed: Apr. 4, 1994

[30] Foreign Application Priority Data

Apr. 16, 1993 [FR] France ........ 93 04605

[51] Int. Cl.[6] ........ B07C 5/342; G06F 19/00

[52] U.S. Cl. ........ 364/552; 209/580; 209/587; 348/91; 382/110

[58] Field of Search ........ 209/580, 581, 209/585, 587; 348/89, 91; 364/506, 507, 552; 382/110

[56] References Cited

U.S. PATENT DOCUMENTS

| | | | |
|---|---|---|---|
| 2,988,219 | 6/1961 | Bartlett | 209/581 X |
| 3,012,666 | 12/1961 | Cox | 209/581 |
| 3,013,661 | 12/1961 | Strubhar | 209/581 |
| 3,142,383 | 7/1964 | Boyer | 209/585 |
| 3,206,022 | 9/1965 | Roberts, Jr. et al. | 209/585 X |
| 4,246,098 | 1/1981 | Conway et al. | 209/558 |
| 4,281,933 | 8/1981 | Houston et al. | 356/425 |
| 4,324,335 | 4/1982 | Conway et al. | 209/586 |
| 4,330,062 | 5/1982 | Conway et al. | 209/582 |
| 4,515,275 | 5/1985 | Mills et al. | 382/110 X |
| 4,534,470 | 8/1985 | Mills | 348/89 X |
| 4,645,080 | 2/1987 | Scopatz | 209/558 |
| 4,687,107 | 8/1987 | Brown et al. | 364/506 X |
| 4,701,049 | 10/1987 | Beckman et al. | 356/3.07 |
| 4,843,561 | 6/1989 | Larson | 364/478 |

FOREIGN PATENT DOCUMENTS

| | | |
|---|---|---|
| 0231027 | 8/1987 | European Pat. Off. . |
| 9000565 | 10/1991 | Netherlands . |
| 2167180 | 8/1985 | United Kingdom . |

*Primary Examiner*—Edward R. Cosimano
*Attorney, Agent, or Firm*—William R. Hinds

[57] ABSTRACT

In a method and apparatus for generating colorimetric data useful in the automatic colorimetric sorting of products, such as fruits or vegetables, each product is illuminated by means of a beam producing a succession of lines of light, the energy reflected by the product in preselected wavelengths is reconstituted for each point on each line of light, the light intensity of each point is measured, the measured values are converted so as to form a series of numerical data corresponding, for each wavelength, to the light intensity curves for each line of light, and the series of numerical data are processed, by computing, in accordance with programmed criteria based on a comparison of the values of the homologous points of said series, so as to generate usable colorimetric data.

25 Claims, 7 Drawing Sheets

C

C
Q
C
C

METHOD AND DEVICE FOR GENERATING COLORIMETRIC DATA FOR USE IN THE AUTOMATIC SORTING OF PRODUCTS, NOTABLY FRUITS OR VEGETABLES

FIELD OF THE INVENTION

The invention concerns a method and device for generating colorimetric data for use in the automatic sorting of products, notably fruits or vegetables.

BACKGROUND OF THE INVENTION

Modern fruit stations are confronted with the ever more pressing problem of the search for quality. In addition, modern distribution networks require perfectly homogeneous batches of fruits and vegetables, with regard to both quality and colour, the quality of the fruit being assessed by means of conventional visual criteria laid down by fruit and vegetable regulations.

As a result of such requirements, manual-sorting staff need to make efforts which prevent high grading rates being achieved. These staff must in fact pick out, from amongst the fruits being conveyed, those which are to be downgraded, the defects justifying such downgrading being of various kinds: diseased fruits, impacts, cuts, etc.

A good qualitative grading therefore requires skilled personnel and reasonable working rates appreciably lower than the maximum speeds of the packing lines.

The solutions currently employed for automating sorting and replacing staff all use electronic systems based on cameras. However, these systems do not make it possible to meet the requirements of the producers entirely, since the qualitative approach is then considered from a colorimetric point of view, given that the defects have a particular colour.

Unfortunately, the physical reality of the phenomenon is quite different. In fact, and by way of example, a fresh impact on an apple does not impair its color and yet the fruit must be downgraded. Similarly, a fruit affected by "biter pit" does not have any color impairment on the surface, whilst underneath the skin the fruit is rotten. Moreover, natural cavities in fruits (pistillary and peduncular) are considered to be blemishes since they naturally include light brown blemishes ("russetting"), and detecting such cavities results in the downgrading of the fruits whilst these parts of the fruit are subject to particular rules, more flexible than with the other parts of said fruit.

The present invention aims to mitigate these drawbacks and its main objective is to provide a method and device for generating colorimetric data enabling the various selection criteria for products such as fruit and vegetables to be met, without being influenced by parts of them which would not give rise to rejection.

Another object of the invention is to provide a method and device suitable for supplying data representing the quality, color and volume of the products.

Another objective of the invention is to provide a device which may be installed on a conveyor with several conveying lines, and to afford a high degree of uniformity in grading over the whole of said conveyor.

SUMMARY OF THE INVENTION

To this end, the invention relates to a method for generating colorimetric data for use in the automatic colorimetric sorting of products, notably fruits or vegetables, which comprises:

illuminating each product by means of at least one beam suitable for producing a line of light on the surface of said product, moving the line of light and the product relative to each other so as to illuminate successively the maximum number of points observable on the surface of said product, splitting each line of light into a succession of points and, for each of said points, reconstituting, in preselected wavelengths, at least part of the light energy reflected by the product, for each preselected wavelength, measuring the light intensity of each point on each line of light, and supplying analog data representing said intensity, for one of the preselected wavelengths and for each point on each line of light, supplying data, referred to as the distance data, representing the distance between the point of origin and an area situated in the immediate vicinity of the point of impact of the beam on the product, for each line of light, converting the analog data representing the light intensity into a series of numerical values, each representing the gray level, in the wavelength in question, of the point corresponding to said line of light, so that each of the series of values corresponds to the light intensity curve, in said wavelength, of said line of light, converting each item of distance data so as to obtain a series of numerical values representing the physical profile of the product such that any natural cavities on the surface of said product can be distinguished, storing the series of numerical data corresponding to each preselected wavelength and to each line of light, and processing, by computing, the series of numerical data in accordance with programmed criteria based on a comparison of the values of the homologous points of said series, so as to generate colorimetric data which can be used by taking into account only the points of the numerical series which do not correspond to a cavity.

In the first place, such a method, according to which preselected wavelengths of the light energy reflected by the products are used, makes it possible to improve the concept by which the grading is determined, and thereby to increase the accuracy of said grading.

This is because only one color of fruit corresponds to each numerical value representing a light intensity, the margin of error in the determination of said color being absolutely non-existent.

By way of example, such a method makes it possible to remove the ambiguity existing between a Golden Delicious apple with a rough area and a Golden Delicious apple with a rosy patch. Such an ambiguity, which cannot be removed by existing devices, has great importance since roughness constitutes a downgrading factor whilst rosy patches constitute a quality factor.

Likewise, and also by way of example, this method makes it possible to discern defects such as fresh impacts which cannot be detected by current methods.

In addition, according to this method, the colorimetric data provided is not affected by the presence of any cavities, which in particular avoids having to position the products in a specific manner for sorting and which therefore allows continuous automatic feeding of said products.

According to one preferred mode of implementation:

the series of numerical values corresponding to the light intensity curves are compared so as to supply data relating to the quality of the product, consisting of:

absence-of-defect data, when there is no concave-shaped discontinuity in any of the curves, absence-of-defect data, when a concave-shaped discontinuity is present in at least one curve but not in all said curves, data indicating presence of defect in the discontinuity region, when a concave-shaped discontinuity is present in the same region of all the curves, the calculations aimed at generating the colorimetric data are carried out solely by means of the values of the numerical series which led to the provision of absence-of-defect data.

This method makes it possible to take into account, for the purpose of determining the colorimetric classification of the products, only the surfaces of this product which are sound and without defect, that is to say surfaces free from impacts etc.

In addition, according to another characteristic:

when there is a concave-shaped discontinuity in all the curves leading to the provision of presence-of-defect data:

when there is no cavity, data representing the state of the defect are computed in accordance with programmed criteria, and when there is at least one cavity, the points concerned are not taken into consideration.

This method of implementation makes it possible to remove any ambiguity and to interpret all types of phenomena which may arise at the surface of the product.

In addition and above all, this method of implementation enables the colorimetric aspect and the qualitative aspect to be differentiated whilst, at the present time, the qualitative aspect is approached solely from the colorimetric aspect, which leads to many aberrations with regard to the sorting data provided.

According to another characteristic of the invention, each product is illuminated by means of an incident beam suitable for illuminating a point on the surface of said product, and said beam is moved so as to produce a line of light.

Moreover, with regard to the illumination of the products and advantageously:

a first monochromatic polarized beam is used, and the energy back-scattered by each point is split into two polarization planes, so as to obtain the physical profiles of the product, simultaneously the product is illuminated by means of a second polychromatic beam composed of a discreet number of preselected wavelengths, and the light energy reflected by the product is reconstituted for each of the wavelengths of this polychromatic beam, so as to obtain the data representing the light intensity curves.

In addition, the monochromatic and polychromatic beams are preferably superimposed so as to illuminate each product at a single point. This arrangement makes it possible to obtain the color originating from a single point by analyzing the energy back-scattered by this point for the different wavelengths.

Moreover, a polychromatic beam is advantageously used, composed of at least three wavelengths chosen from amongst the following colours: red, green, blue, yellow.

The monochromatic beam used is preferably an infrared beam.

The use of an infrared beam has two advantages. On the one hand, in fact, the color of the products have no effect on such a beam. In addition, the infrared beam enables additional information to be obtained, consisting of an infrared intensity curve related to the dimensions of the products and which may be used for:

locating exactly the start and end of each product, obtaining, by successive summations of the profiles in the infrared region, data representing the volume of the product.

Moreover, polychromatic and monochromatic beams originating from laser sources are preferably used.

The use of laser sources enables wavelengths determined to within a nanometre to be used. In addition, the laser power makes it possible to detect defects below the skin which are invisible to the naked eye.

According to another characteristic of the invention relating to a method in which the products are, in a conventional manner, moved along a sorting line, and each beam is moved, on the one hand parallel to the direction of movement of the products so as to form longitudinal lines of light consisting of a succession of aligned points and, on the other hand, transversely, so as to cover the surface of the product with a succession of parallel lines of light.

The invention extends to a device for generating colorimetric data for use in the automatic sorting of products, notably fruits or vegetables, which comprises in combination:

first illumination means suitable for forming a line of light on the surface of the product, second illumination means suitable for generating a polarized monochromatic beam, and producing, by means of said beam, a line of light on the surface of the product, means for moving the lines of light and the product relative to each other, arranged so as to enable the maximum number of points observable on the surface of said product to be illuminated successively, an acquisition channel including sensors suitable for collecting the light energy reflected by the product in the preselected wavelengths and supplying analog signals representing, for each point on each line of light and in each of said wavelengths, the light intensity of said point, means of separating the polarized incident beam and the depolarized light energy reflected by the product, an optical unit disposed so as to receive only the light energy reflected by the product and adapted for supplying an analog signal representing the distance between said optical unit and an area situated in the immediate vicinity of the point of impact of the incident beam on the product, and a central processing unit including:

analog to digital conversion means arranged for receiving the analog signals originating from the sensors and for supplying, for each point and in each wavelength, a numerical value representing the gray level of said point, analog to digital conversion means arranged for receiving the analog signals originating from the optical unit and for supplying, for each point of impact of the beam on the product, a numerical value representing the distance between a point of origin and an area situated in the immediate vicinity of said point of impact, means for storing the numerical values in the form of a series of values representing the physical profile of the product, means for storing the numerical values in the form of a series of values each representing, for each wavelength, the light intensity curve of a line of light, and computing means programmed for calculating, from on the one hand criteria for comparing the numerical values of the homologous points of the intensity curves and, on the other hand, values representing the physical profile of the product, colorimetric data which can be used whilst taking into account only the points on the intensity curves which do not correspond to a cavity.

Moreover, the sensors preferably comprise means for splitting the light energy reflected by the product into a discreet number of preselected wavelengths and, for each wavelength, collection and focusing means, and a detector arranged for receiving the energy collected and for supplying an analog signal representing said energy.

In addition, the splitting means advantageously consist of at least one optical deflection plate selected for given wavelengths.

According to another characteristic of the invention, these splitting means are also inserted between the two faces forming the hypotenuse of two rectangular prisms, one of said prisms being disposed so that one of its faces constitutes the inlet window of said splitting means.

By virtue of this disposition, and in the first place, the arrangement of the different optical components forms, between the entry face and the exit face, a complete optical system with the same optical index. Because of this, the Fresnel reflexion is minimised since it takes place on the entry and exit faces which are as orthogonal as possible to the average directions of the beams entering and leaving the system.

It should also be noted that, for the purpose of further minimising these reflexions, the different faces may be given a conventional non-reflective treatment.

Advantageously, the splitting means may be of two types. Thus they may consist either of a diffraction grid, or at least two mirrors which are holographic by reflexion, spaced apart and selective for the predetermined wavelengths.

Moreover, the optical unit is advantageously adapted for supplying a second analog signal representing the light intensity reflected by the product in the wavelength of the incident beam.

According to another characteristic of the invention, the central processing unit comprises:

- a first electronic card, referred to as the amplification card, suitable for amplifying the analog signals supplied by the sensors and the optical unit,
- a second electronic card, referred to as the remote measurement card, including analog to digital conversion means and arranged for receiving the amplified signals originating from the optical unit, said card including a computing unit programmed for identifying the natural cavities and the damaged areas of the product, and for calculating the volume of said product from the light-intensity signal by deducting the areas corresponding to cavities from the result obtained,
- a third electronic card, referred to as the color processing card, including analog to digital conversion means and arranged for receiving the amplified signals supplied by the various sensors, and the amplified signal representing the light intensity for the wavelength selected for the optical unit, said card including a computing unit programmed for using a colorimetric sorting algorithm for the points enabled,
- a fourth card, referred to as the quality processing card, including analog to digital conversion means and arranged for receiving the amplified signals supplied by the various sensors, and the amplified signal representing the light intensity for the wavelength selected for the optical unit, said card including a computing unit programmed:
  - for seeking out any concave-shaped discontinuities in all the wavelengths present in the energy scattered by the product and, when a discontinuity is present in an area for all the wavelengths, for interrogating the remote measurement processing card for the purpose of inhibiting, where appropriate, the results of the colorimetric sorting where this area corresponds to a natural cavity,
  - for quantifying the defect observed in the areas of discontinuity which do not correspond to cavities,
- means for communicating the results in the form of three numerical values representing the quality, color and volume of the product.

The device of the invention can notably enable fruits to be sorted on a conveyor including n conveying lines. In this case, and advantageously, the first illumination means comprise a single illumination source delivering a beam divided into at least n beams carried by optical fibres at each line.

This arrangement enables the different conveying lines to be illuminated in a strictly identical manner, whatever the change in the light source. Because of this, any problem relating to any difference in luminosity from one line to the next is eliminated, and perfect uniformity of grading is achieved over the whole of the machine.

BRIEF DESCRIPTION OF THE DRAWINGS

Other characteristics, aims and advantages of the invention will emerge from the following detailed description given with reference to the accompanying drawings which represent, by way of non-limitative example, a preferred embodiment thereof. In these drawings, which form an integral part of the present description.

DETAILED DESCRIPTION OF EMBODIMENTS OF THE INVENTION

The aim of the device shown in the figures is to provide a deterministic, flexible and evolutive technique, for meeting the various criteria for selecting fruits and vegetables without being influenced by the areas on the latter which would not entail rejection.

Figure 1:
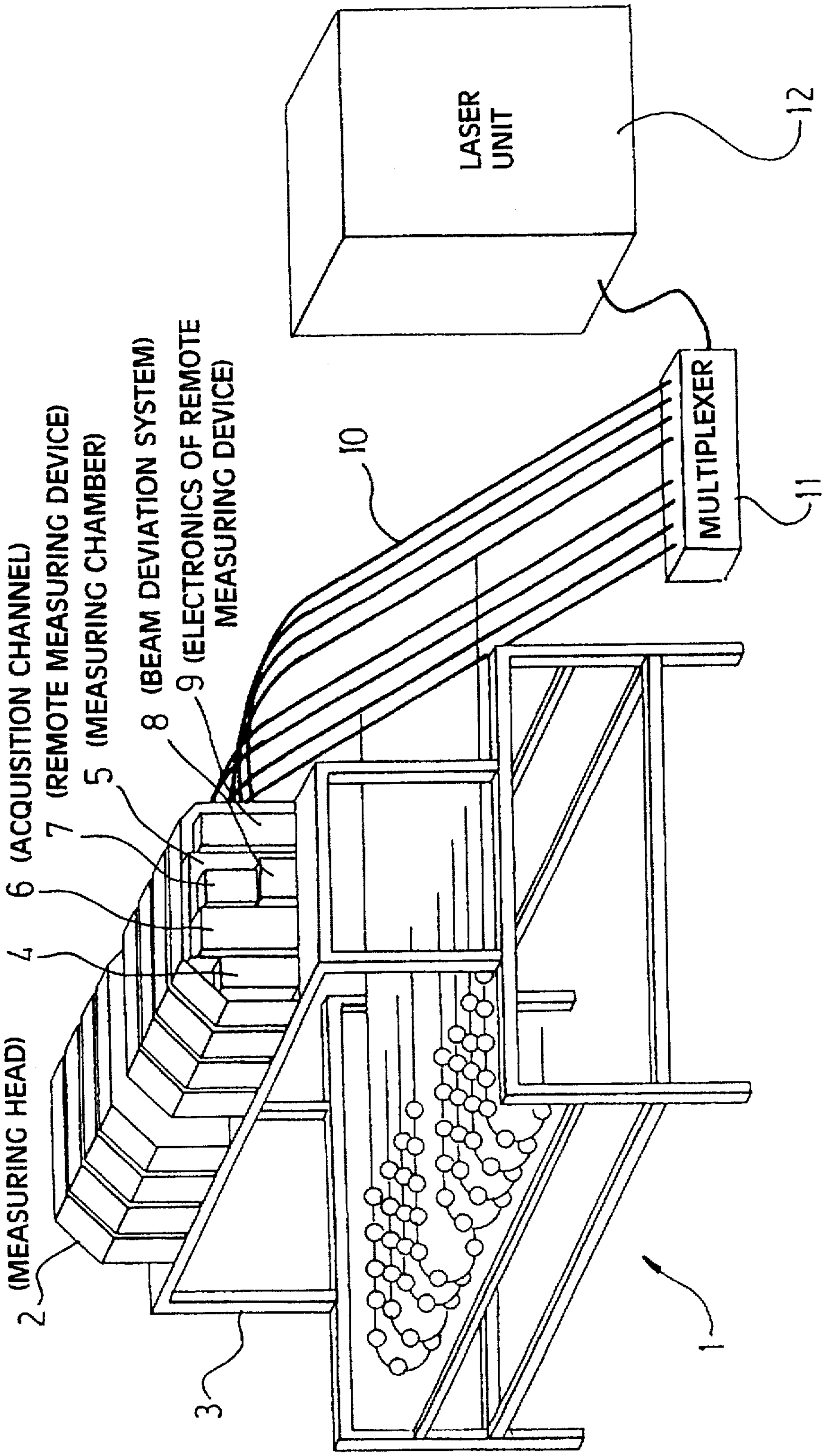
FIG. 1 is a diagrammatic perspective view of a fruit conveyor with n conveying lines, equipped with a device according to the invention.

In the first place, the conveyor 1 shown in FIG. 1 is a conventional conveyor including n parallel conveying lines each provided, for example, with a plurality of rollers spaced apart, between which the fruit are lodged, and said rollers may be driven in rotation about their rotational axis in line with the sorting device.

This device consists of n measuring heads, such as 2, each disposed above a conveying line and resting on a gantry 3 disposed transversely above the conveyor 1.

Each of these measuring heads 2 includes an electronic process-monitoring rack 4, a measuring chamber 5 containing an acquisition channel 6 suitable for collecting the energy reflected by the fruit, a remote measuring device 7 and a beam deviation system 8. Each measuring head also includes the electronics 9 of the remote measuring device.

Each measuring head is also connected, through an optical fibre such as 10 and a multiplexer 11 for n optical fibres 10, to a cabinet 12 containing a laser unit including a multiline laser (in this example red, green and blue) and, in a conventional manner, the means for cooling said laser and an electrical cabinet.

Figure 2:
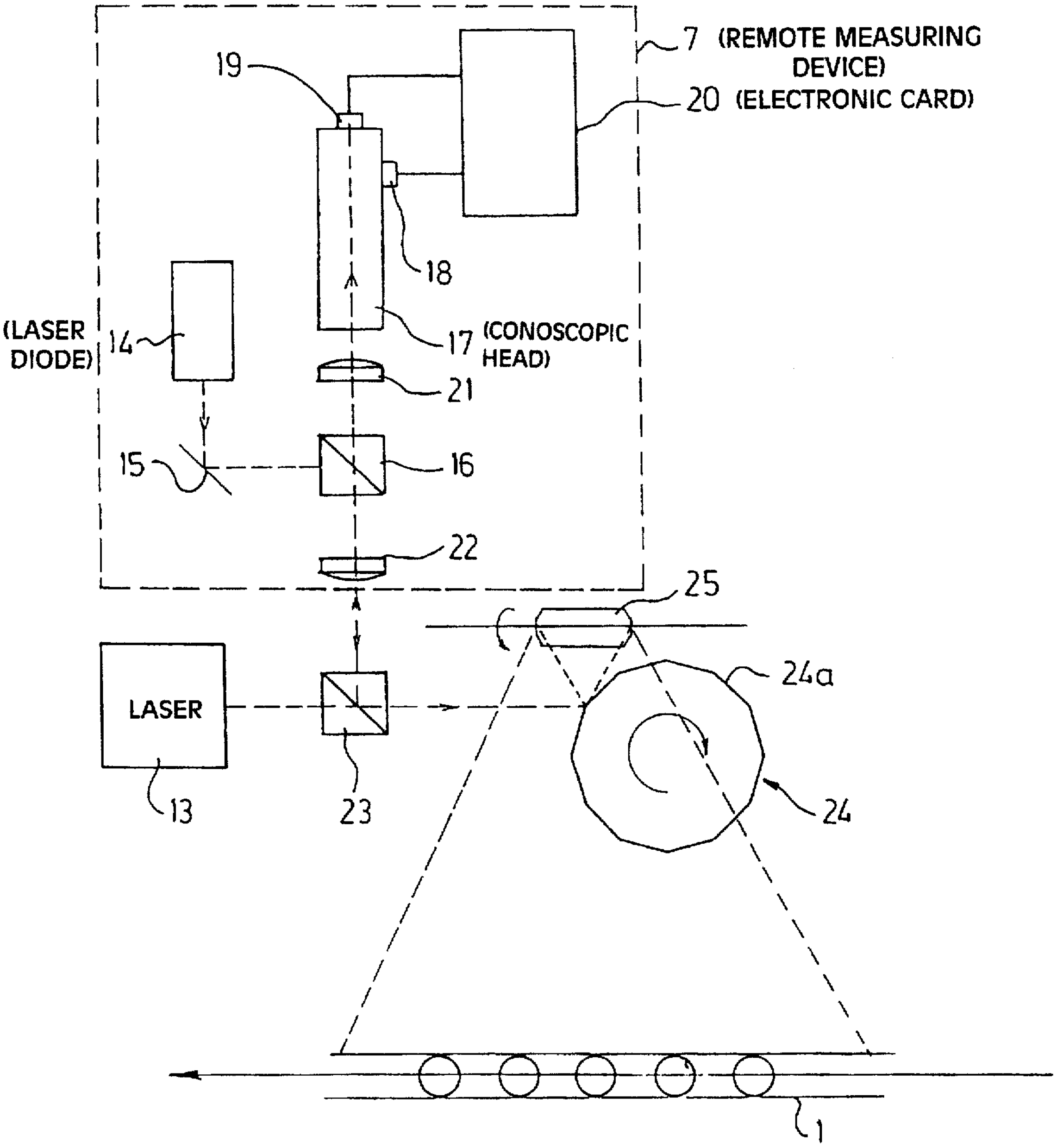
FIG. 2 is a diagram representing a device according to the invention.

FIG. 2 shows diagrammatically on the one hand a remote measuring device and multiline laser 13 inserted according to the invention in an optical assembly enabling the monochromatic beam originating from the remote measuring device 7 and the polychromatic beam originating from the laser 13 to be superimposed and, on the other hand, a system for deflecting the beams thus superimposed.

In the first place, the remote measuring device 7 includes a collimated infrared laser diode 14, the beam of which is delivered by means of a reflective mirror 15 to a separator 16 distinguishing the outward and return beams. This remote measuring device 7 also has a conoscopic head 17 associated with two avalanche diodes 18, 19, and an electronic card 20 suitable for calculating and supplying signals representing, on the one hand the conoscopic fruit/head distance 17 and, on the other hand, the light intensity reflected by the fruit in the infrared region.

This remote measuring device also includes two imaging lenses 21, 22 disposed on each side of the separator 16 and adapted for focusing the beam respectively on the fruit and on the conoscopic head 17.

The beam originating from this remote measuring device 7 and the beam originating from the multiline laser 13 are delivered to a dichroic beam separator 23 suitable, as indicated above for superimposing said beams.

This superimposed beam is itself delivered to a deflection system comprising, in the first place, a rotating polygon 24 provided with facets such as 24a suitable for reflecting the incident beam and generating lines of light, said polygon being associated with means for driving in rotation (not shown).

These deflection means also comprise a mirror 25 mounted so as to oscillate with respect to a longitudinal axis and arranged so as to intercept the line of light originating from a face 24a on the polygon 24 and for projecting this line of light towards the conveying line.

This oscillating mirror 25 is also associated with rotation means (not shown) suitable for pivoting the latter about its longitudinal axis so that the line of light sweeps the width of the conveying line.

The acquisition channel 6 includes, in the first place, means for splitting the light energy reflected by the product into a discreet number of wavelengths corresponding to the wavelengths of the multiline laser beam. It also includes, for each wavelength, collection and focusing means, and a detector arranged for supplying an analog signal representing the reflected energy.

Figure 3:
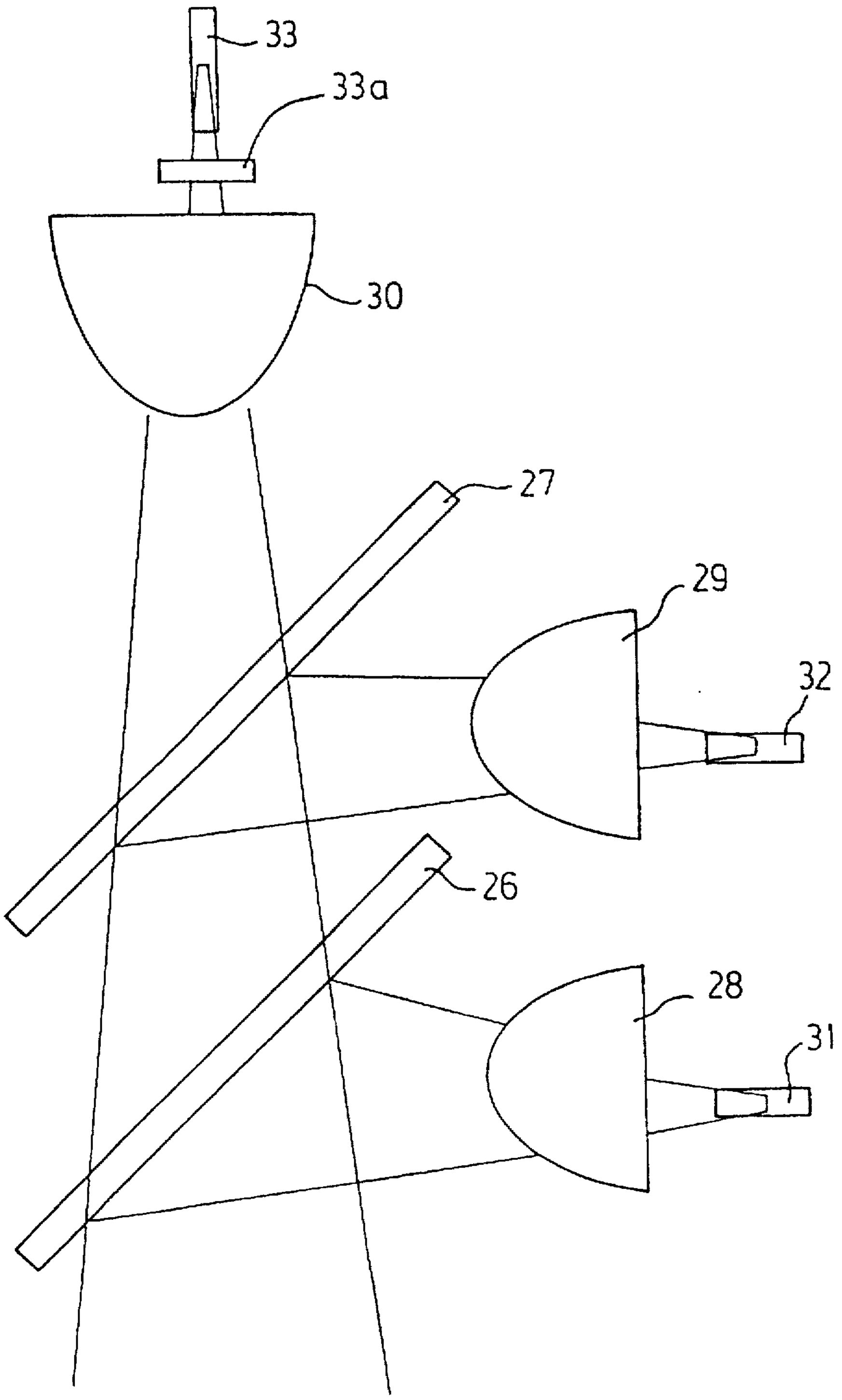
FIG. 3 is a diagram representing a first type of sensor fitted to the device according to the invention.
Figure 4:
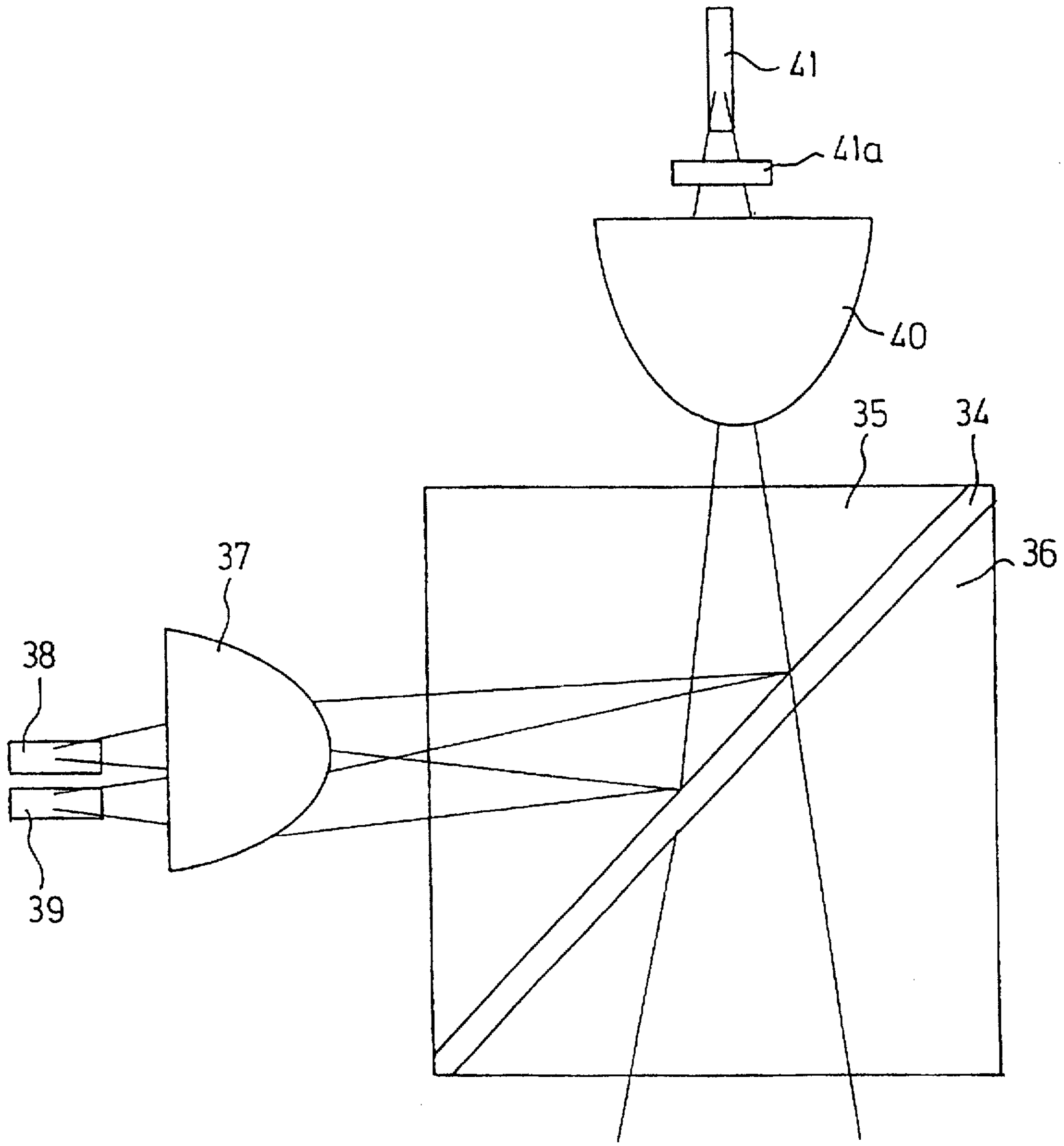
FIG. 4 is a diagram representing a variant sensor which may be fitted to the device according to the invention.

Two variant acquisition channels are shown respectively in FIGS. 3 and 4.

The acquisition channel in FIG. 3 includes two mirrors 26, 27 which are holographic by reflexion, spaced apart and parallel, adapted so as each to deflect one of the wavelengths of the multiline beam, and so as to be transparent for the third wavelength.

For each of these wavelengths, this acquisition channel includes collection and focusing means consisting of a condenser 28, 29, 30 and detectors 31, 32, 33. In addition, an infrared filter 33a is disposed in front of the detector 33 corresponding to the third wavelength.

As for the acquisition channel shown in FIG. 4, this comprises a diffraction grid 34 inserted between the hypotenuse faces of two rectangular prisms 35, 36 forming a cube with said diffraction grid, said cube being disposed so that one of its faces constitutes the inlet window of the acquisition channel.

This acquisition channel also includes collection and focusing means consisting of a first condenser 37 common for two detectors 38, 39 disposed downstream of the latter, and a second condenser 40 associated with a third detector 41 and an infrared filter 41a.

The device according to the invention also has synchronisation means for creating a digitizing zone centred on the fruits to be examined. These include in the first place means, such as a cell, for detecting the point of origin of the line of light generated by the rotation of the polygon. They also include means for measuring step by step the movement of the fruits on the conveyor.

From these data, the triggering of a processing cycle is given by the central processing unit for each movement of the product by one step, when the signal originating from the detection cell is received.

Figures 6, 7, 8, 8A, 8B:
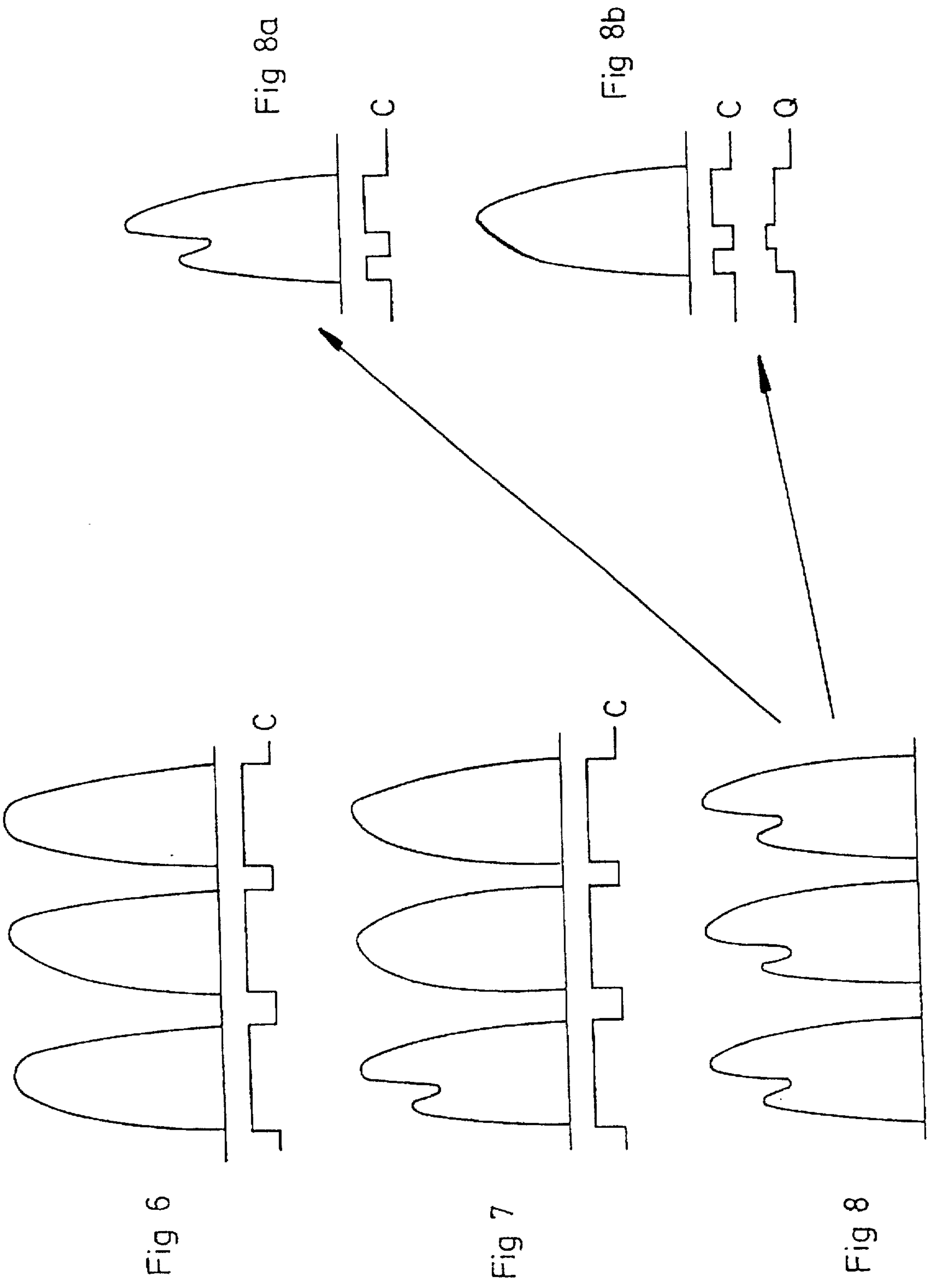
FIGS. 6, 7, 8, 8*a* and 8*b* illustrate light-intensity curves of the type that may be obtained according to the method of the invention, and the color and quality processing curves associated with these curves.

The principle of the processing carried out in accordance with the invention for the purpose of effecting the colorimetric and qualitative analyses is illustrated in FIGS. 6, 7 and 8, which show three intensity curves as obtained when the light energy reflected by a line of light is split in accordance with the three wavelengths of the multiline laser beam.

In the case in FIG. 6, where the curves corresponding to the three wavelengths do not have any discontinuity, the colorimetric analysis, shown diagrammatically by the curve C, is effected for all the points on the curve.

The qualitative analysis consists of concluding that all the points analyzed are sound. The same applies when, as shown in FIG. 7, a single curve (or two of them) has a concave-shaped discontinuity.

On the other hand, when, as shown in FIG. 8, the three curves have a concave-shaped discontinuity in the same area, the signal supplied by the remote measuring device is used.

In the case in FIG. 8a where the signal supplied by this remote measuring device reveals the presence of a natural cavity shown by a concave-shaped discontinuity, the colorimetric analysis is carried out for the points other than those corresponding to this area. No qualitative analysis is carried out in addition.

On the other hand, as shown in FIG. 8*b*, if the signal originating from the remote measuring device does not have any discontinuity, the discontinuity noted for the curves representing the wavelengths of the laser beam necessarily corresponds to a defect such as a blemish, etc.

In this case, the colorimetric analysis is carried out for the points other than those corresponding to the area of the cavity. In addition, a qualitative analysis shown diagrammatically by the curve Q is carried out for the points in this area.

Figure 5:
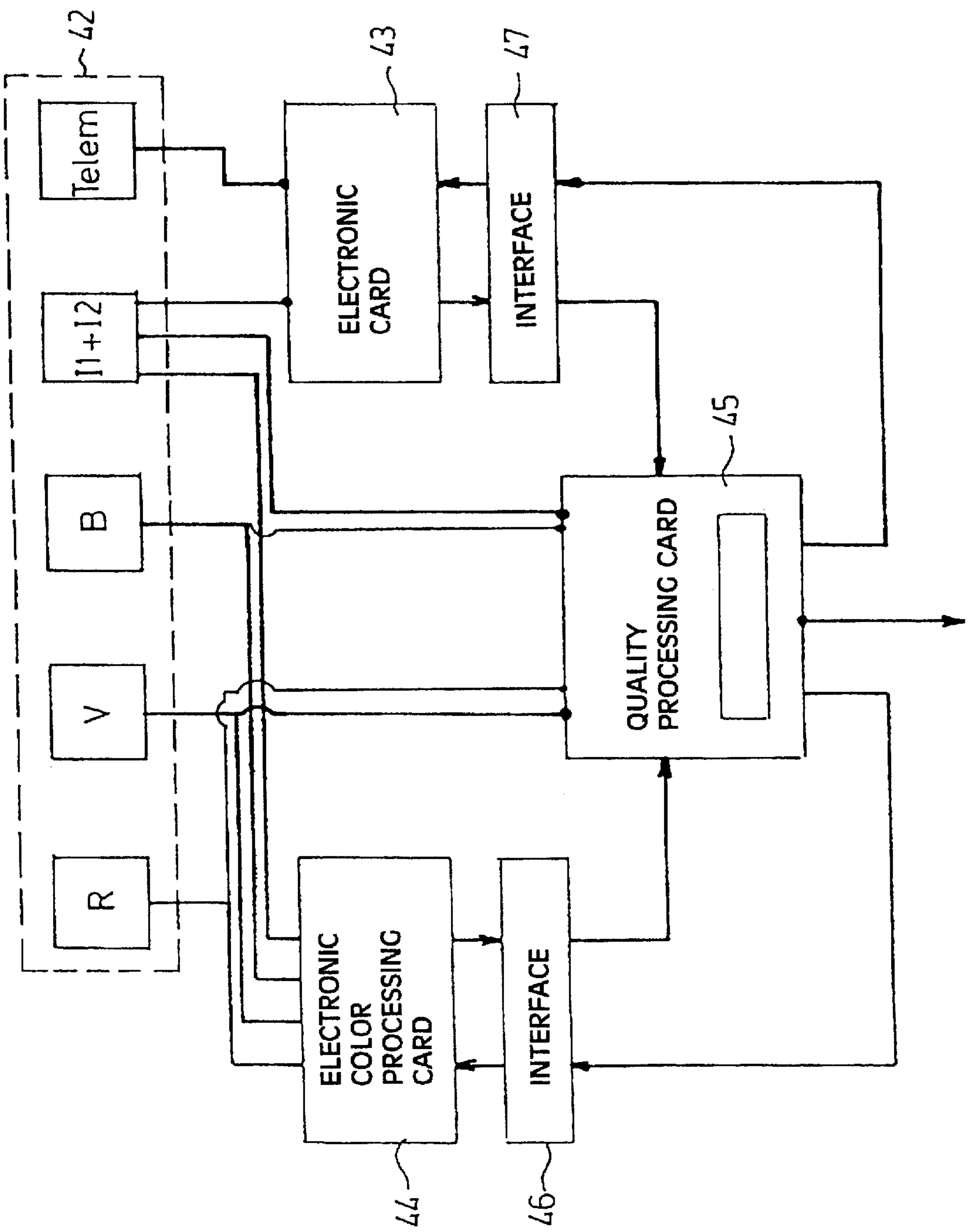
FIG. 5 is a diagram representing the central processing unit of the device according to the invention.

This processing is carried out by means of a central unit shown diagrammatically in FIG. 5 and comprising:

a first electronic amplification card 42, suitable for amplifying the analog signals supplied by the sensors 31–33 or 38, 39, 41 and the remote measuring device 7, a second electronic card, referred to as the remote measurement card 43, including analog to digital conversion means and arranged for receiving the amplified signals originating from the remote measuring device 7, said card including a computing unit programmed for identifying the natural cavities and the damaged areas of the product, and for calculating the volume of said product from the light intensity signal by deducting the areas corresponding to cavities from the result obtained, a third electronic color processing card 44, including analog to digital conversion means and arranged for receiving the amplified signals supplied by the various sensors 31–33 or 38, 39, 41, and the amplified signal representing the light intensity in the infrared region, said card including a computing unit programmed for using a colorimetric sorting algorithm for the points enabled, a fourth quality processing card 45, including analog to digital conversion means and arranged for receiving the amplified signals supplied by the various sensors 31–33 or 38, 39, 41, and the amplified signal representing the light intensity in the infrared region, said card including a programmed computing unit:

for seeking the concave-shaped discontinuities in all the wavelengths present in the energy scattered by the fruit and, when a discontinuity is present in an area for all the wavelengths, for interrogating the remote measurement processing card 43 for the purpose if necessary of inhibiting the results of the colorimetric sorting where this area corresponds to a natural cavity, for quantifying the defect observed in the areas of discontinuity which do not correspond to cavities, interfaces 46, 47 for communicating respectively between the color processing card 44 and the quality processing card 45, and between the remote measurement processing card 43 and the quality processing card 45, means (not shown) for communicating the results in the form of three numerical values representing the quality, color and volume of the product.

The defect processing algorithm resulting in the determination of a numerical value representing a quality note is explained below with reference to FIGS. 9 and 10.

Figure 9:
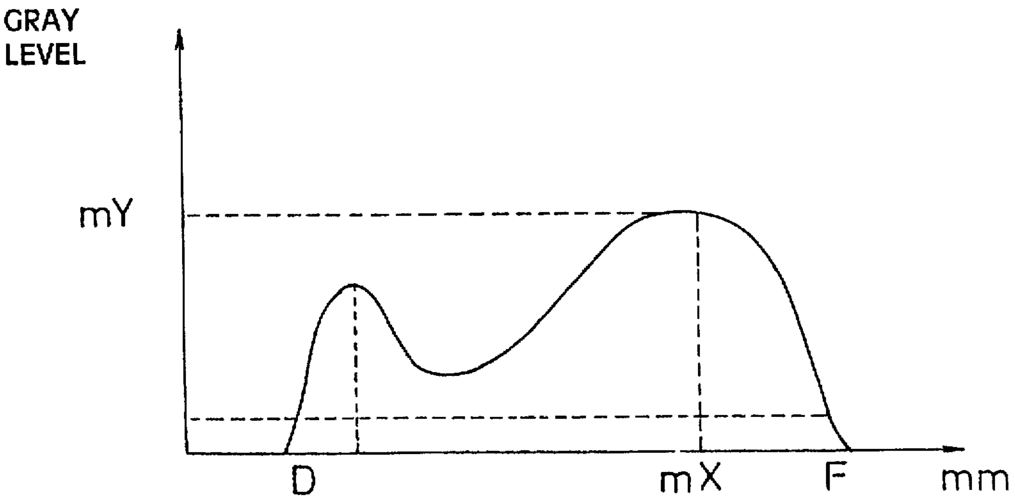
FIGS. 9 and 10 are two curves intended to explain the defect detection algorithm according to the invention.

In the first place, it is necessary to locate particular points on the curve, namely the abscissae of the starting point D and ending point F of this curve, and the coordinates mX, mY of the highest point on this curve (see FIG. 9).

The algorithm is based on the principle that, for all the abscissa points lower than mX, the curve must be constant or increasing.

In consequence, any point i of ordinate Yi, such that Yi is less than the ordinate Yi−1 of a previous point i−1, will be considered to be a blemish. This assessment may however be refined by accepting certain differences in amplitude, that is by considering the point i to be blemished only if (Yi−Yi−1) is less than a predetermined threshold.

For the abscissa points greater than mX for which the curve must normally be constant or decaying, it suffices to cross these points in the direction of the decreasing abscissae in order to obtain a similar relationship.

The following step consists of quantifying the blemish, and this quantification must be identical for two fruits of different shapes.

Normalisation is therefore effected by carrying out a projection in a normalisation space in which, for a given blemish and whatever its position on the fruit, the same associated gray level is obtained.

Knowing the maximum size of the fruits to be analyzed, the gray level of the blemished pixel will be projected onto a straight line such that the value obtained corresponds to that of a fruit of maximum size.

Figure 10:
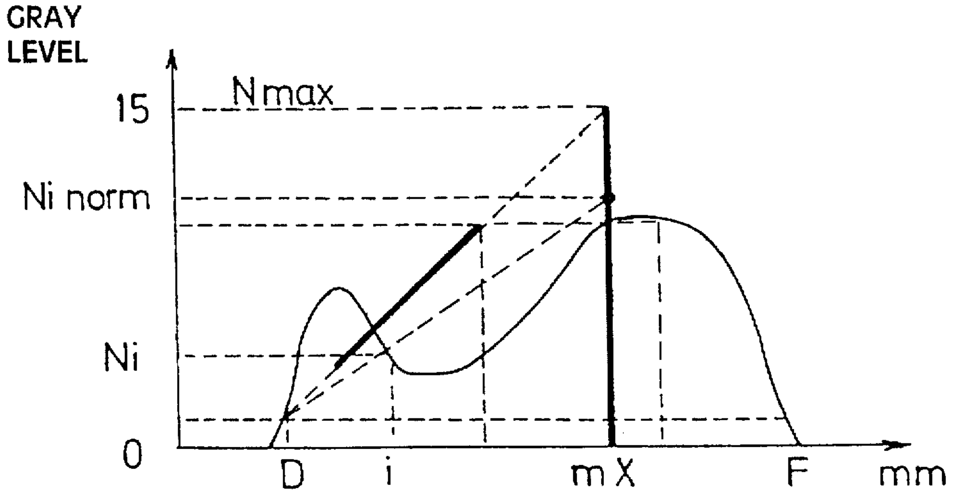

As shown in FIG. 10, a simple proportional calculation enables the position of this projection line to be found. This is because, knowing D, i and mY, it is obvious that the distance between D and the normalisation straight line (Thales theorem) can be found. The pixel i is then projected along the axis D Ni onto the projection line, in order to obtain the normalised gray level point Ni.norm.

Once this processing has been carried out, all the points between D and F are replaced by the intensity values of the gray levels, so as to obtain a new curve in which:

the unblemished points have a zero value, the blemished points have a value corresponding to the normalised gray level, the points outside the section DF have a value of −1.

This curve is then modified as a function of the results obtained by remote measurement and for the other wavelengths, this modification consisting for example of attributing:

the value −1 to the points corresponding to natural cavities, a zero value when the blemish is a simple patch of colour.

The curve thus being validated, the number of sound points (zero value) and the number of points with a positive value are stored in memory, which amounts to storing a gray-level histogram.

The colorimetric processing algorithm consists of storing, initially, for each wavelength, the values of the gray levels (0 to 255) of all the points in the area DF. The following steps depend on the fruit to be graded and the predominant colors in the latter, and can be adapted to each type of fruit. By way of example, for apples, the colorimetric spectra between green and blue $$\frac{NiV - NiB}{NiV + NiB}$$

and between red and green $$\frac{NiR - NiV}{NiR + NiV}$$

are calculated for each point.

All these values being bounded between −1 and +1, a normalisation is then carried out by adding +1 to each of said values, and then the latter are multiplied by 16.

Finally, a 32-level histogram is established for each curve.

What is claimed is:

1. A method for generating colorimetric data for use in the automatic colorimetric sorting of products, notably fruits or vegetables, which comprises:

illuminating each product by means of at least one beam suitable for producing a line of light on the surface of said product, moving the line of light and the product relative to each other so as to illuminate successively the maximum number of points observable on the surface of said product, splitting each line of light into a succession of points and, for each of said points, reconstituting, in preselected wavelengths, at least part of the light energy reflected by the product, for each preselected wavelength, measuring the light intensity of each point on each line of light, and supplying analog data representing said intensity, for one of the preselected wavelengths and for each point on each line of light, supplying data, referred to as the distance data, representing the distance between the point of origin and an area situated in the immediate vicinity of the point of impact of the beam on the product, for each line of light, converting the analog data representing the light intensity into a series of numerical values, each representing the gray level, in the wavelength in question, of the point corresponding to said line of light, so that each of the series of values corresponds to the light intensity curve, in said wavelength, of said line of light, converting each item of distance data so as to obtain a series of numerical values representing the physical profile of the product such that any natural cavities on the surface of said product can be distinguished, storing the series of numerical data corresponding to each preselected wavelength and to each line of light, and processing, by computing, the series of numerical data in accordance with programmed criteria based on a comparison of the values of the homologous points of said series, so as to generate colorimetric data which can be used by taking into account only the points of the numerical series which do not correspond to a cavity.

2. A method as claimed in claim 1, wherein each product is illuminated by means of an incident beam suitable for illuminating a point on the surface of said product, and said beam is moved so as to produce a line of light.

3. A method as claimed in claim 1, wherein the products are moved along a sorting line (1), and each beam is moved, on the one hand parallel to the direction of movement of the products so as to form longitudinal lines of light consisting of a succession of aligned points and, on the other hand, transversely, so as to cover the surface of the product with a succession of parallel lines of light.

4. A method as claimed in claim 1, wherein:

the series of numerical values corresponding to the light intensity curves are compared so as to supply data relating to the quality of the product, consisting of:

absence-of-defect data, when there is no concave-shaped discontinuity in any of the curves, absence-of-defect data, when a concave-shaped discontinuity is present in at least one curve but not in all said curves, and data indicating presence of defect in the discontinuity region, when a concave-shaped discontinuity is present in the same region of all the curves, and the calculations aimed at generating the colorimetric data are carried out solely by means of the values of the numerical series which led to the provision of absence-of-defect data.

5. A method as claimed in claim 4, wherein:

when there is a concave-shaped discontinuity in all the curves leading to the provision of presence-of-defect data:

when there is no cavity, data representing the state of the defect are computed in accordance with programmed criteria, and when there is at least one cavity, the points concerned are not taken into consideration.

6. A method as claimed in claim 5, wherein:

the product is illuminated by means of a first monochromatic polarized beam, and the energy back-scattered by each point is split into two-polarization planes, so as to obtain the physical profiles of the product, and simultaneously the product is illuminated by means of a second polychromatic beam composed of a discreet number of preselected wavelengths, and the light energy reflected by the product is reconstituted for each of the wavelengths of this polychromatic beam, so as to obtain the data representing the light intensity curves.

7. A method as claimed in claim 6, wherein the two monochromatic and polychromatic beams are superimposed so as to illuminate the product at a single point.

8. A method as claimed in claim 6, wherein a polychromatic beam is used, composed of at least three wavelengths chosen from amongst the following colors: red, green, blue, yellow.

9. A method as claimed in claim 6, wherein a monochromatic infrared beam is used.

10. A method as claimed in claim 6, wherein polychromatic and monochromatic beams originating from laser sources (13, 14) are used.

11. A device for generating colorimetric data for use in the automatic sorting of products, notably fruit or vegetables, which comprises in combination:

first illumination means (13, 24) suitable for forming a line of light on the surface of the product, second illumination means (14, 15, 23) suitable for generating a polarized monochromatic beam, and producing, by means of said beam, a line of light on the surface of the product, means (25) for moving the lines of light and the product relative to each other, arranged so as to enable the maximum number of points observable on the surface of said product to be illuminated successively, an acquisition channel (6) including sensors (26–33; 34–41) suitable for collecting the light energy reflected by the product in the preselected wavelengths and supplying analog signals representing, for each point on each line of light and in each of said wavelengths, the light intensity of said point, means (16) of separating the polarized incident beam and the depolarized light energy reflected by the product, an optical unit (17–20) disposed so as to receive only the light energy reflected by the product and adapted for supplying an analog signal representing the distance between said optical unit and an area situated in the immediate vicinity of the point of impact of the incident beam on the product, and a central processing unit (42–47) including:

analog to digital conversion means arranged for receiving the analog signals originating from the sensors (26–33; 34–41) and for supplying, for each point and in each wavelength, a numerical value representing the gray level of said point such that any natural cavities on the surface of said product can be distinguished, analog to digital conversion means arranged for receiving the analog signals originating from the optical unit (17–20) and for supplying, for each point of impact of the beam on the product, a numerical value representing the distance between a point of origin and an area situated in the immediate vicinity of said point of impact, means for storing the numerical values in the form of a series of values representing the physical profile of the product, means for storing the numerical values in the form of a series of values each representing, for each wavelength, the light intensity curve of a line of light, and computing means programmed for calculating, from on the one hand criteria for comparing the numerical values of the homologous points of the intensity curves and, on the other hand, values representing the physical profile of the product, colorimetric data which can be used whilst taking into account only the points on the intensity curves which do not correspond to a cavity.

12. A device as claimed in claim 11 for the sorting of fruits on a conveyor (1) including n conveying lines, wherein the first illumination means comprise a single illumination source (12) supplying a beam divided into at least n beams carried by optical fibres (10) at each line.

13. A device as claimed in claim 11, wherein the optical unit (17–20) is adapted for supplying a second analog signal representing the light intensity reflected by the product in the wavelength of the incident beam.

14. A device as claimed in claim 13, wherein the second illumination means (14, 15, 23) include optical means (15, 23) suitable for mixing the incident beams supplied by the first (13) and second illumination means so as to obtain a single beam for illuminating the product.

15. A device as claimed in claim 13, wherein the central processing unit comprises:

a first electronic card (42), referred to as the amplification card, suitable for amplifying the analog signals supplied by the sensors (26–33; 34–41) and the optical unit (17–20), a second electronic card (43), referred to as the remote measurement card, including analog to digital conversion means and arranged for receiving the amplified signals originating from the optical unit (17–20), said card including a computing unit programmed for identifying the natural cavities and the damaged areas of the product, and for calculating the volume of said product from the light-intensity signal by deducting the areas corresponding to cavities from the result obtained, a third electronic card (44), referred to as the color processing card, including analog to digital conversion means and arranged for receiving the amplified signals supplied by the various sensors (26–33; 34–41), and the amplified signal representing the light intensity for the wavelength selected for the optical unit (17–20), said card including a computing unit programmed for using a colorimetric sorting algorithm for the points enabled, a fourth card (45), referred to as the quality processing card, including analog to digital conversion means and arranged for receiving the amplified signals supplied by the various sensors (26–33; 34–41), and the amplified signal representing the light intensity for the wavelength selected for the optical unit (17–20), said card including a computing unit programmed:

for seeking out any concave-shaped discontinuities in all the wavelengths present in the energy scattered by the product and, when a discontinuity is present in an area for all the wavelengths, for interrogating the remote measurement processing card (43) for the purpose of inhibiting, where appropriate, the results of the colorimetric sorting where this area corresponds to a natural cavity, and for quantifying the defect observed in the areas of discontinuity which do not correspond to cavities, and means for communicating the results in the form of three numerical values representing the quality, color and volume of the product.

16. A device as claimed in claim 11, wherein the first illumination means comprise:

at least one laser source (13) adapted for supplying a multiline beam of preselected wavelengths, and means (24) for deflecting the multiline beam suitable for generating a line of light.

17. A device as claimed in claim 16, wherein the laser source consists of a multiline laser (13).

18. A device as claimed in claim 17, wherein the means for moving the line of light and the product relative to each other comprise:

a mirror (25) mounted on an oscillating axis and arranged so as to intercept the line of light originating from the deflection means (24) along an axis parallel to its oscillating axis, and so as to project it onto the surface of the product, and means for rotating the oscillating axis suitable for pivoting the mirror (25) so as to move the line of light in a direction orthogonal to its longitudinal axis.

19. A device as claimed in claim 16, wherein the deflection means comprise a polygon (24) with faces (24*a*) suitable for reflecting the multiline beam, and means for driving said polygon in rotation about its rotational axis.

20. A device as claimed in claim 19, comprising:

means for detecting a point, referred to as the point of origin, of the line of light generated by the rotation of the polygon (24), and means for measuring step by step the movement of the products on the conveyor, the central processing unit (42–47) being programmed for triggering a processing cycle for each movement of the product by one step, when the signal originating from the detection means is received.

21. A device as claimed in claim 11, wherein the sensors (26–33; 34–41) comprise means (26, 27; 34–36) for splitting the light energy reflected by the product into a discreet number of preselected wavelengths and, for each wavelength, collection and focusing means (28–30; 37, 40), and a detector (31–33; 38, 39, 41) arranged for receiving the energy collected and for supplying an analog signal representing said energy.

22. A device as claimed in claim 21, wherein the splitting means consist of at least one optical deflection plate (26, 27; 34) selective for given wavelengths.

23. A device as claimed in claim 22, wherein the splitting means (26, 27; 34) are inserted between the two faces forming the hypotenuse of two rectangular prisms (35, 36), one of said prisms being disposed so that one of its faces constitutes the inlet window of the splitting means.

24. A device as claimed in claim 22, wherein the splitting means consist of a diffraction grid (34).

25. A device as claimed in claim 22, wherein the splitting means consist of at least two mirrors (26, 27) which are holographic-by reflexion, spaced apart and selective for the predetermined wavelengths.

* * * * *